US012561063B2

(12) United States Patent
Mu et al.

(10) Patent No.: US 12,561,063 B2
(45) Date of Patent: Feb. 24, 2026

(54) COMMAND CONFIGURATION METHOD, COMMAND CONFIGURATION UNIT, DISPLAY PROCESSOR UNIT, AND ELECTRONIC DEVICE

(71) Applicants: VERISILICON MICROELECTRONICS (CHENGDU) CO., LTD., Sichuan (CN); VERISILICON MICROELECTRONICS (SHANGHAI) CO., LTD., Shanghai (CN); VERISILICON MICROELECTRONICS (NANJING) CO., LTD., Jiangsu (CN); VERISILICON TECHNOLOGY (SHANGHAI) CO., LTD., Shanghai (CN); VERISILICON MICROELECTRONICS (HAINAN) CO., LTD., Hainan (CN)

(72) Inventors: Jiebin Mu, Sichuan (CN); Ting Ye, Sichuan (CN); Xinghong He, Sichuan (CN); Jia Li, Sichuan (CN); Huiming Zhang, Sichuan (CN)

(73) Assignees: VERISILICON MICROELECTRONICS (CHENGDU) CO., LTD., Sichuan (CN); VERISILICON MICROELECTRONICS (SHANGHAI) CO., LTD., Shanghai (CN); VERISILICON MICROELECTRONICS (NANJING) CO., LTD., Jiangsu (CN); VERISILICON TECHNOLOGY (SHANGHAI) CO., LTD., Shanghai (CN); VERISILICON MICROELECTRONICS (HAINAN) CO., LTD., Hainan (CN)

( * ) Notice: Subject to any disclaimer, the term of this patent is extended or adjusted under 35 U.S.C. 154(b) by 141 days.

(21) Appl. No.: 18/566,811

(22) PCT Filed: Sep. 19, 2023

(86) PCT No.: PCT/CN2023/119841
§ 371 (c)(1),
(2) Date: Dec. 4, 2023

(87) PCT Pub. No.: WO2025/059875
PCT Pub. Date: Mar. 27, 2025

(65) Prior Publication Data
US 2025/0147666 A1     May 8, 2025

(51) Int. Cl.
*G06F 3/06*          (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ...................................................... G06F 3/0613
(Continued)

(56) References Cited

U.S. PATENT DOCUMENTS 7,912,997 B1      3/2011  Murray
10,269,167 B1*    4/2019  Imbrogno ............. G06T 15/005
(Continued)

FOREIGN PATENT DOCUMENTS

CN          101989241 A        3/2011
CN          103106177 A        5/2013
(Continued)

OTHER PUBLICATIONS

International Search Report and Written Opinion with regard to PCT/CN2023/119841 mailed May 23, 2024.
(Continued)

*Primary Examiner* — Christopher B Shin
(74) *Attorney, Agent, or Firm* — BCF LLP

(57)          ABSTRACT

The present application provides a command configuration method, a command configuration unit, a display processor unit, and an electronic device and relates to the field of data transmission. The command configuration unit comprises: a readable data channel including a buffer and a selector, the buffer being configured with a plurality of buffer regions; and a plurality of command interfaces, each of the command interfaces being configured to correspond to a different one of the buffer regions, respectively. Each of the command interfaces is configured to be connected to the image pro-
(Continued)

cessing module. The selector is configured to receive the readable data and store the readable data in a corresponding buffer region according to the identification information. Each of the command interfaces is configured to acquire the readable data from the corresponding buffer region and configure the image processing module based on the configuration command in the readable data.

16 Claims, 6 Drawing Sheets

(58) Field of Classification Search
USPC ......................................................... 710/104
See application file for complete search history.

(56) References Cited

U.S. PATENT DOCUMENTS

| | | | | |
|---|---|---|---|---|
| 10,380,969 | B2 * | 8/2019 | Meixner ............ | H04N 1/32358 |
| 11,093,276 | B2 * | 8/2021 | Zhou ........................ | G06F 9/467 |
| 2008/0005296 | A1 * | 1/2008 | Lee ....................... | H04L 49/901 |
| | | | | 709/223 |
| 2008/0147993 | A1 * | 6/2008 | Kaneko ..................... | G06T 1/20 |
| | | | | 711/147 |
| 2008/0211803 | A1 * | 9/2008 | Kaneko ............... | G06F 9/30003 |
| | | | | 345/418 |
| 2009/0055569 | A1 * | 2/2009 | Maheshwari ....... | G06F 13/4027 |
| | | | | 710/316 |
| 2019/0227838 | A1 | 7/2019 | Zhou et al. | |
| 2022/0114118 | A1 * | 4/2022 | Lee ......................... | G06F 3/061 |
| 2023/0064619 | A1 * | 3/2023 | Lim .................... | G06F 12/0238 |
| 2023/0081310 | A1 * | 3/2023 | Li ........................... | G06F 21/78 |
| | | | | 711/163 |

FOREIGN PATENT DOCUMENTS

| | | |
|---|---|---|
| CN | 107943726 A | 4/2018 |
| CN | 108228498 A | 6/2018 |

OTHER PUBLICATIONS

Office Action with regard to the counterpart EP Patent Application No. 23 889 841.5 mailed May 14, 2025.

* cited by examiner

Storage Space of Buffer

COMMAND CONFIGURATION METHOD, COMMAND CONFIGURATION UNIT, DISPLAY PROCESSOR UNIT, AND ELECTRONIC DEVICE

The present disclosure is a National Stage of International Application No. PCT/CN2023/119841 filed on Sep. 19, 2023, entitled "COMMAND CONFIGURATION METHOD, COMMAND CONFIGURATION UNIT, DISPLAY PROCESSOR UNIT, AND ELECTRONIC DEVICE".

TECHNICAL FIELD

The present application relates to the field of data transmission and in particular to a command configuration method, a command configuration unit, a display processor unit, and an electronic device.

BACKGROUND ART

A DPU (Display Processor Unit) configures the parameters of each image processing module in the DPU according to a control command sent from a CPU (Central Processing Unit), so as to process image data and send the image data to a display device.

Currently, the DPU may transmit control commands by using DMA (Direct Memory Access). The DPU reads a control command from a DRAM (Dynamic Random Access Memory) by DMA technology and transmits it back to the DPU. The DPU parses the control command to obtain configuration parameters, and each image processing module of the DPU is configured according to the configuration parameters, so that the DPU performs corresponding functions.

The control command may be read from the DRAM by the DMA technology via a transmission bus with a bandwidth up to 128 bits or 256 bits, whereas the DPU receives the control command via an interface bus with a bandwidth of only 32 bits. As a result, the DMA technology only allows for transmission of the control command to the DPU using a bus bandwidth of 32 bits, and the bandwidth of the transmission bus cannot be fully utilized.

As images are increasingly required to have a higher dynamic range, frame rate, resolution, and the like, the number of the image processing modules needed by the DPU also increases, and the burden on the CPU for configuring the DPU also increases. Moreover, the DPU shares a common command configuration system with other modules or circuits in the device, all of which read commands from the DRAM based on the DMA. If the DPU fails to make full use of its own transmission bandwidth or bus bandwidth, the overall performance of the device where the DPU is located will also be affected.

SUMMARY

In view of this, the present application is intended to provide a command configuration method, a command configuration unit, a display processor unit, and an electronic device to improve the utilization of a bandwidth by the display processor unit, so as to improve the efficiency of command configuration for each module of the display processor unit.

In a first aspect, an embodiment of the present application provides a command configuration unit, comprising: a readable data channel including a buffer and a selector, the buffer being connected to the selector, the buffer being configured with a plurality of buffer regions, the selector being configured to be connected to a memory that outputs readable data, the readable data including a configuration command and identification information, the configuration command including parameters for configuring each image processing module in a display processor unit, the identification information representing a buffer region corresponding to the readable data; and a plurality of command interfaces, each of which is connected to the buffer, respectively, and each of which is configured to correspond to a different one of the buffer regions, respectively; each of the command interfaces being configured to be connected to the image processing module; wherein the selector is configured to receive the readable data and store the readable data in a corresponding buffer region according to the identification information; each of the command interfaces is configured to acquire the readable data from the corresponding buffer region and configure the image processing module based on the configuration command in the readable data.

In the embodiment of the present application, the command interface can acquire a configuration command from the readable data and configure the image processing module. Then, when transmitting the readable data and a read request, the readable data can be transmitted in accordance with the bandwidth of a transmission bus, which is greater than the bit width of an interface of the image processing module, without being transmitted in accordance with the bandwidth of the interface of the image processing module. In this way, the utilization of the transmission bandwidth can be improved to improve the efficiency of configuration of the display processor unit. Meanwhile, requesting or parsing of a plurality of configuration commands can be performed in parallel by the command configuration unit described above, whereby the efficiency of configuration of the display processor unit can be further improved.

In one embodiment, the command configuration unit further comprises: a read request channel, wherein the read request channel includes a plurality of read request generators, and each of the read request generators corresponds to a different one of the command interfaces, respectively; each of the read request generators is configured to send a read request to the memory; and the memory is configured to send the readable data to the buffer in response to the read request.

In the embodiment of the present application, a plurality of read request generators are configured in the read request channel, and different read request generators correspond to different command interfaces, respectively, whereby the respective read request channels can generate read requests corresponding to different command interfaces, and the generation and sending of a plurality of read requests are performed in parallel. Thus, the read requests can be generated with an effectively improved efficiency so as to improve the efficiency of acquisition of configuration commands for each image processing module, thereby improving the efficiency of configuration of the image processing modules, as compared with a mode in which the read requests are generated and sent one by one.

In one embodiment, the read request channel further includes a read request arbiter; the read request arbiter is connected to each of the read request generators and is configured to be connected to the memory; and the read request arbiter is configured to control the order of output of each of the read requests based on a preset output priority rule.

Some image processing modules have high real-time requirements, whereas the memory needs to receive the read requests one by one. Therefore, in an embodiment of the present application, a read request arbiter is arranged in the read request channel, so that a read request corresponding to a command interface with higher priority can be preferentially outputted to the memory to read the readable data, so as to meet the requirements of the respective image processing modules for real-time acquisition of configuration commands.

In one embodiment, the readable data channel further includes: an address cache connected to the buffer and to each of the command interfaces, respectively, wherein the address cache is configured to store a write address of the readable data in the buffer region and a read address of the readable data read out from the buffer region; the command interface is configured to read the readable data from the buffer region according to the write address; and the selector is configured to store the readable data in the corresponding buffer region according to the read address and the identification information.

In the embodiment of the present application, the address cache is used to record a read address and a write address. This enables the command interface to accurately acquire the readable data from the buffer so as to improve the accuracy of configuration of the image processing module.

In one embodiment, the readable data channel further includes a base address memory group, the base address memory group includes a plurality of base address memories, and the address cache is connected to each of the command interfaces through each of the base address memories, respectively; and the base address memory is configured to provide the write address for the command interface connected to this base address memory after the readable data is stored in the buffer region.

In the embodiment of the present application, based on the base address memory group recording the write addresses, the command interface only needs to receive the write address stored in the corresponding base address memory without configuring additional judgment logic, whereby the configuration efficiency of the command interface is improved. In one embodiment, the readable data channel further includes a buffered read arbiter; the buffered read arbiter is connected to the buffer and to each of the command interfaces, respectively; and the buffered read arbiter is configured to instruct each of the command interfaces to acquire the readable data from the buffer.

In the embodiment of the present application, usually only one command interface is allowed to read data from the buffer at a time. A buffered read arbiter is arranged to instruct each command interface to sequentially acquire the readable data from the buffer, thereby reducing the possibility of data loss and reading errors and improving the accuracy of configuration of the display processor unit.

In one embodiment, each of the command interfaces includes a command cache 121 and a command parser, the command cache 121 is connected to the buffer, and the command cache 121 is connected to the command parser; the command parser is configured to be connected to the image processing module; the command cache 121 is configured to store the readable data acquired from the buffer; and the command parser is configured to output the readable data to the image processing module in a preset format to configure the image processing module.

In the embodiment of the present application, the command cache 121 may temporarily store data to be outputted to a module of the display processor unit, so that the command parser can read and output the readable data from the command cache 121 in a preset format. The command cache 121 and the command parser enable the command interface to perform data conversion and to convert the configuration command into data that can be used by the image processing module, whereby the readable data before being transmitted to the image processing module can be transmitted with a bandwidth greater than the bandwidth of the image processing module, so as to make full use of the bandwidth of the transmission bus to improve the efficiency of configuration of the image processing module.

In one embodiment, the command parser includes a first parser or a second parser; the configuration command includes a coefficient command, which is configured for configuring an image processing module having a three-dimensional lookup table; the second parser is configured to output the readable data to the image processing module in accordance with a magnitude of an output bandwidth of the second parser; and the output bandwidth of the second parser in each of the command interfaces matches a bandwidth of each of the image processing modules having the three-dimensional lookup table in the display processor unit, respectively.

In the embodiment of the present application, an image processing module including a 3D LUT (3D Look Up Table, three-dimensional lookup table) receives a coefficient command for configuring the three-dimensional lookup table. However, different coefficient commands involve different bandwidths. If the coefficient commands are transmitted with the same bandwidth, the transmission bandwidth may not be fully utilized. Therefore, a second parser is configured in the command interface, and the output bandwidth of each second parser is matched with the bandwidth of each image processing module having a three-dimensional lookup table in the display processor unit, respectively, whereby each of the image processing modules with different bandwidths can have a corresponding second parser for parsing, so that the outputted coefficient command can be matched with each image processing module. In this way, the configuration with the system commands can be completed at one time without performing multiple configurations or introducing invalid data or the like, and the bandwidth can be fully utilized.

In one embodiment, the buffer regions corresponding to the respective command interfaces share a storage space of the buffer, and the storage space corresponding to each of the buffer regions is allocated according to the quantity of the readable data in the buffer corresponding to each of the command interfaces.

In this embodiment, the size of the storage space corresponding to the buffer region is dynamically allocated depending on the quantity of readable data, and sufficient storage space can be allocated for the readable data in different cases of transmitting the readable data, thereby meeting the needs of transmission of the readable data in different scenarios and expanding the applicable scope of the command configuration unit.

An embodiment of the present application further provides a command configuration method applied to a command configuration unit, the command configuration unit comprising: a readable data channel including a buffer and a selector, the buffer being connected to the selector, the buffer being configured with a plurality of buffer regions, the selector being configured to be connected to a memory that outputs readable data, the readable data including a configuration command and identification information, the configuration command including parameters for configuring a display processor unit, the identification information representing a buffer region corresponding to the readable data; and a plurality of command interfaces, each of which is connected to the buffer, respectively, and each of which is configured to correspond to a different one of the buffer regions, respectively; each of the command interfaces being configured to be connected to the display processor unit; and the command configuration method comprising: receiving the readable data by the selector; storing the readable data in a corresponding buffer region according to the identification information of the received readable data by the selector; acquiring the readable data from the buffer region corresponding to the command interface by the command interface; and configuring the display processor unit based on the configuration command in the readable data by the command interface.

In a third aspect, an embodiment of the present application provides a display processor unit, comprising: a command configuration unit as described in any embodiment of the first aspect; and a plurality of image processing modules, connected to the command configuration unit, respectively.

In a fourth aspect, an embodiment of the present application provides an electronic device, comprising: a display processor unit as described in the third aspect; and a controller and a memory, the memory being connected to the controller and the display processor unit, respectively; wherein the controller is configured to generate the readable data and store the readable data into the memory; and the memory is configured to output the readable data to the display processor unit in response to a read request from the display processor unit.

In one embodiment, the memory is configured with a plurality of storage regions, wherein each of the storage regions corresponds to a different one of the command interfaces, respectively; and each of the storage regions is configured to store the readable data corresponding to each of the command interfaces, respectively.

In a fifth aspect, an embodiment of the present application provides an image display system, comprising: an electronic device as described in any embodiment of the fourth aspect; and a display device, communicatively connected to the electronic device and configured to display image data outputted from the display processor unit.

BRIEF DESCRIPTION OF DRAWINGS

In order to more clearly illustrate the technical solutions of embodiments of the present application, drawings required to be used in the embodiments will be described briefly below. It is understood that the drawings below are merely illustrative of some embodiments of the present application and thus should not be considered as limiting its scope. It will be appreciated by those of ordinary skill in the art that other relevant drawings can be obtained according to these drawings without any inventive effort.

Figure 1:
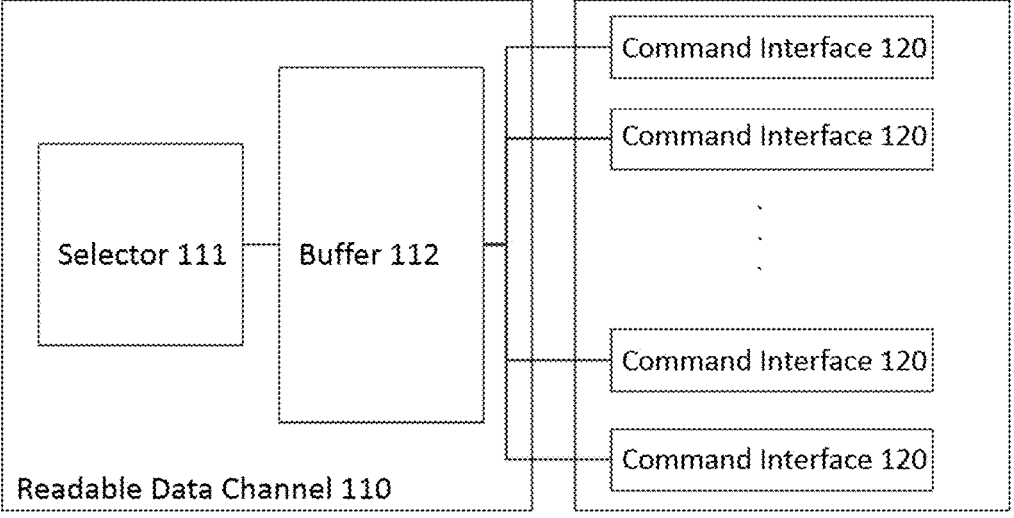
FIG. 1 is a schematic diagram of a command configuration unit according to an embodiment of the present application.

Reference Numerals: command configuration unit 100; readable data channel 110; selector 111; buffer 112; address cache 113; base address memory group 114; buffered read arbiter 115; command interface 120; command cache 121; first parser 122; second parser 123; read request channel 130; read request generator 131; read request arbiter 132; display processor unit 200; image processing module 210; electronic device 300; controller 310; memory 320; display system 400; display device 410.

DETAILED DESCRIPTION OF EMBODIMENTS

The present application is described below in further detail with reference to the accompanying drawings and embodiments, in order to provide a clearer understanding of the objectives, technical solution, and advantages of the present application. It is understood that the specific embodiments described herein are only intended to explain the present application and are not intended to limit the present application.

Referring to FIG. 1, FIG. 1 is a schematic diagram of a command configuration unit 100 according to an embodiment of the present application. The command configuration unit 100 comprises a readable data channel 110 and a plurality of command interfaces 120.

The readable data channel 110 includes a buffer 112 and a selector 111. The buffer 112 is connected to the selector 111, and the buffer 112 is configured with a plurality of buffer regions. The selector 111 is configured to be connected to a memory that outputs readable data.

The buffer 112 may be any type of memory, for example, an SRAM (Static Random-Access Memory), a DRAM (Dynamic Random Access Memory), a PSRAM (Pseudo Static Random-Access Memory), or the like.

After generating configuration commands, a DPU stores the configuration commands in a memory for allowing the DPU to read them from the memory. Here, the DPU which is an image processor includes a plurality of image processing modules, and the configuration commands are used for configuring different image processing modules.

Figure 2:
FIG. 2 is a schematic diagram of storage space of a buffer according to an embodiment of the present application.

Referring to FIG. 2, FIG. 2 is a schematic diagram of storage space of a buffer according to an embodiment of the present application. In the embodiment of the present application, since a plurality of command interfaces 120 are included, the storage space of the buffer 112 may be divided into a plurality of buffer regions, and each buffer region corresponds to one command interface 120, whereby the readable data corresponding to each command interface 120 is stored by using each buffer region, respectively. The size of the buffer region may be set as needed. For example, one buffer region may have a size of 256 bytes, 512 bytes, or the like.

In some embodiments, the buffer regions corresponding to the respective command interfaces share the space of the buffer, and the storage space corresponding to each of the buffer regions is dynamically allocated according to the quantity of the readable data in the buffer corresponding to each of the command interfaces. For example, there are ten command interfaces corresponding to ten buffer regions, and the ten buffer regions share the storage space of one buffer. One buffer can store ten pieces of readable data. If the storage space is allocated equally, a space for storing one piece of readable data is allocated to each of the ten buffer regions. In this embodiment, the storage space may be allocated to each buffer region according to the quantity of the readable data inputted into the buffer and the command interface corresponding to each readable data, and the storage space allocated to one buffer region may be equal to the storage space of the buffer in a maximum case, or may be zero in a minimum case. For example, when the inputted nine pieces of readable data are data corresponding to command interface 1, and one piece of readable data is data corresponding to command interface 2, then a storage space for storing nine pieces of readable data may be allocated to the buffer region corresponding to the command interface 1, a storage space for storing one piece of readable data may be allocated to the buffer region corresponding to the command interface 2, and no (i.e., zero) storage space is allocated to the other buffer regions. The above description is merely an example and should not be considered as limiting the present application.

In this embodiment, the readable data includes a configuration command and identification information. The configuration command includes parameters for configuring each image processing module in the display processor unit. The specific content thereof may be understood with reference to the prior art and will not be described in detail herein. The identification information represents a buffer region corresponding to the readable data and may be information capable of representing the buffer region, such as an address, a number, or the like, and the identification information may also represent a command interface because the buffer region corresponds to the command interface.

Meanwhile, a selector 111 may be arranged between the buffer 112 and a memory outside the command configuration unit 100, and the selector 111 may store the readable data in the corresponding buffer region according to the identification information, so that each readable data can be stored in the corresponding buffer region.

There are a plurality of command interfaces 120. Each of the command interfaces 120 is connected to the buffer 112, respectively, and each of the command interfaces 120 is configured to correspond to a different one of the buffer regions, respectively. Each of the command interfaces 120 is configured to be connected to the image processing module.

In an embodiment of the present application, the selector 111 is configured to receive the readable data and store the readable data in the corresponding buffer region according to the identification information. Each command interface 120 is configured to acquire the readable data from the corresponding buffer region and configure the image processing module based on the configuration command in the readable data. Thus, before the configuration command is outputted to each image processing module of the display processor unit, the readable data may be transmitted between the memory and buffer 112 in accordance with the bandwidth (e.g., 128 bits, 256 bits, or the like) of the transmission bus, and stored by the delay buffer 112. Each command interface 120 is connected to an image processing module to convert the readable data into data (e.g., 32 bits) that conforms to the bandwidth of the image processing module. The transmitted readable data can be processed in time by parallel operation of the plurality of command interfaces 120. The buffer 112 allows for better utilization of the bandwidth of the transmission bus for the transmission of the readable data. The transmitted readable data can be used through the command interfaces 120. The efficiency of configuration of a plurality of image processing modules can be improved by the parallel operation of the plurality of command interfaces 120. Thus, the command configuration unit 100 can improve the bandwidth utilization and the efficiency of configuration of the image processing modules.

In some embodiments, the command configuration unit 100 is configured with a control unit (not shown in the figure). The control unit may be a control circuit or a combination of a plurality of control circuits. The control unit is configured with various types of control logic to control the cooperative operation of the respective parts in the command configuration unit 100 by the control logic. In some embodiments, the control unit may be a controller of the display processor unit.

Figure 3:
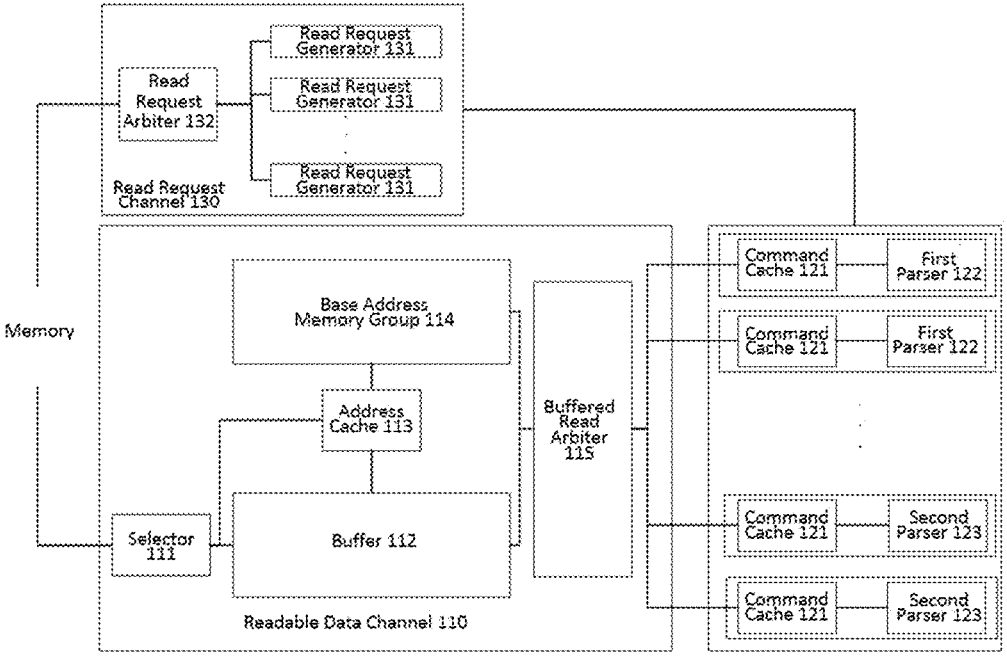
FIG. 3 is an expanded schematic diagram of a command configuration unit according to an embodiment of the present application.

Referring to FIG. 3, FIG. 3 is an expanded schematic diagram of a command configuration unit 100 according to an embodiment of the present application.

In one embodiment, the command configuration unit 100 may further comprise: a read request channel 130. The read request channel 130 includes a plurality of read request generators 131. Each read request generator 131 corresponds to a different command interface 120, respectively. Each read request generator 131 is configured to send a read request to the memory. The memory is configured to send the readable data to the buffer 112 in response to the read request.

The display processor unit acquires a configuration command by sending a read request to the external memory. In the embodiment of the present application, there are a plurality of command interfaces 120. If the display processor unit still generates read requests one by one, the read requests are generated with low efficiency, and the bandwidth of the transmission bus is still utilized at a low rate. Thus, in this embodiment, a plurality of read request generators 131 may be arranged respectively for different command interfaces 120 to generate a plurality of read requests in parallel and then send the read requests to the memory to acquire the readable data. In this way, the read requests are generated with reduced waiting time, and the read requests are generated with improved efficiency, thereby improving the efficiency of configuration of the image processing modules.

Here, in the foregoing embodiment, the numbers of the read request generators 131, the command interfaces 120, and the buffer regions may be the same as the number of the image processing modules in the display processor unit.

In one embodiment, the read request channel 130 may further include a read request arbiter 132. The read request arbiter 132 is connected to each read request generator 131 and is configured to be connected to the memory. The read request arbiter 132 is configured to control the order of output of each read request based on a preset output priority rule.

The reading from the memory is usually performed individually by the display processor unit. In other words, the read requests are usually outputted individually. For example, when an AXI (Advanced extensible Interface, a kind of bus protocol) bus is used as the transmission bus, the AXI interface allows only one read request to be sent at a time. However, some image processing modules in the display processor unit have high real-time requirements. If requests for configuration of such image processing modules are waiting for being outputted after a plurality of read requests are generated simultaneously, the subsequently acquired readable data may not meet the requirements of such image processing modules.

Therefore, a read request arbiter 132 may be configured for such image processing modules, the output end of each read request generator 131 is connected to the read request arbiter 132, and the read requests are arbitrated by the read request arbiter 132 and then outputted to the memory. An output priority rule is configured in the read request arbiter 132 to control the order of output of each read request based on the output priority rule.

The priority rule may be configured according to the requirements of the image processing modules in the display processor unit. The read request arbiter 132 may be an arbitration circuit that implements polling arbitration, weighted polling arbitration, etc. The arbitration circuit may be implemented with reference to the prior art and will be not described further herein.

In one embodiment, the readable data channel 110 further includes: an address cache 113. The address cache 113 is connected to the buffer 112 and to each command interface 120, respectively. The address cache 113 is configured to store a write address of the readable data in the buffer region and a read address of the readable data read out from the buffer region.

In this embodiment, the readable data is stored in the buffer regions of the buffer 112, but multiple pieces of readable data may be stored in a same buffer region, then it is necessary to distinguish the readable data in this buffer region to distinguish the readable data that can be read or the readable data that can be overwritten. Therefore, an address cache may be arranged in such a manner that the address cache is connected to the buffer 112 and to each command interface 120, respectively, so as to use the address cache to record a write address of the readable data in the buffer region and a read address where the readable data is read out, so that the command interface 120 can judge, from the write address and the read address, whether there is unread readable data in the buffer 112, and can acquire the readable data from the buffer 112 if there is unread readable data.

Correspondingly, after determining a corresponding buffer region from the identification information, the selector 111 may further acquire a read address corresponding to the buffer region, and determine the storage space that can be overwritten in the buffer region.

In the above embodiment, the address cache 113 may be implemented by a prior cache and will not be described in detail herein.

In some embodiments, the readable data channel 110 may further include a base address memory group 114. The base address memory group 114 includes a plurality of base address memories. The address cache 113 is connected to each command interface 120 through each base address memory, respectively.

The command interface 120 may not have the function of judging the read addresses and write addresses, then in this embodiment, a base address memory may be arranged such that a write address that can be read in the buffer region is acquired from the buffer region corresponding to the address cache 113 and provided to the corresponding command interface 120 by the base address memory.

A prior device having a storage function may be selected and used as the base address memory. Exemplarily, the base address memory may be a FIFO (First Input First Output) memory, a register, or the like.

In one embodiment, the readable data channel 110 may further include a buffered read arbiter 115. The buffered read arbiter 115 is connected to the buffer 112 and to each command interface 120, respectively. The buffered read arbiter 115 is configured to instruct each command interface 120 to acquire the readable data from the buffer 112.

Similarly to the principle of the read request arbiter 132, usually only one command interface 120 is allowed to read data from the buffer 112 at a time when the command interfaces 120 are reading data from the buffer 112. Correspondingly, in this embodiment, if the plurality of command interfaces 120 need to read data from the buffer 112 simultaneously, the buffered read arbiter 115 may instruct each command interface 120 to read sequentially, thereby reducing the possibility of data loss and reading errors.

Figure 4:
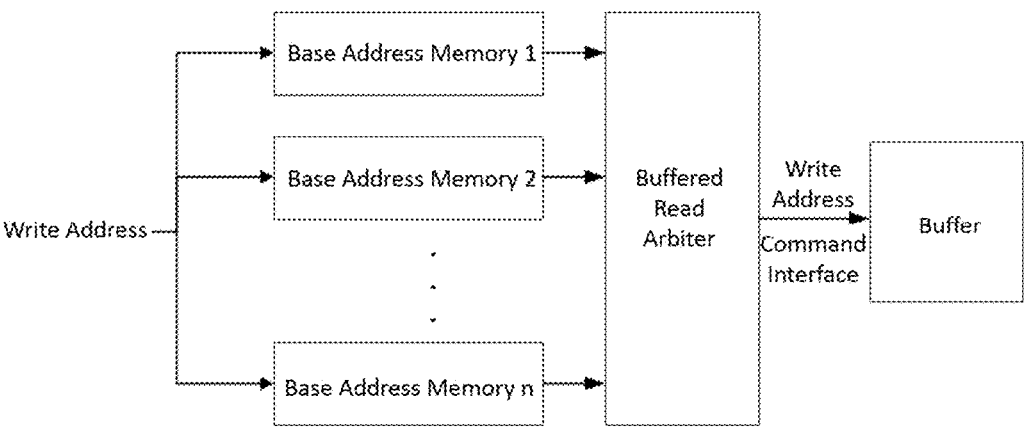
FIG. 4 is a schematic diagram showing read-out through a buffered read arbiter according to an embodiment of the present application.

Then, a command interface 120 currently allowed to receive readable data may be configured to acquire the readable data preferentially, and the read request arbiter 132 preferentially instructs the command interface with priority to acquire the readable data. For example, referring to FIG. 4, the buffered read arbiter determines a command interface capable of acquiring readable data, and feeds the command interface and the write address of the readable data to be read out back to the buffer, so that the command interface can acquire the readable data from the buffer region of the buffer according to the write address.

In an embodiment of the present application, the format of the readable data is a data format adapted to the bandwidth of the transmission bus, which may not be directly accessed by the image processing module, and which should be converted by the command interface 120 into a data format that can be used by the image processing module. However, the conversion process takes time. In this case, the command interface 120 may not receive or not be allowed to receive the readable data. Accordingly, in this embodiment, the command interface 120 allowed to receive readable data may be permitted to preferentially acquire the readable data.

In some embodiments, the preset reading priority rule may also be configured according to the requirements of the image processing modules corresponding to the respective command interfaces 120 for real-time readable data, or in any other way. The buffered read arbiter 115 may be implemented with reference to a prior arbitration circuit and will not be described in detail herein.

In one embodiment, each command interface 120 may include a command cache 121 and a command parser. The command cache 121 is connected to the buffer 112. The command cache 121 is connected to the command parser. The command parser is configured to be connected to the image processing module.

Since the bandwidth of the transmission bus may not match the bandwidth of the interface of the display processor unit, the command interfaces 120 need to convert the bandwidth of the readable data so that the configuration commands in the readable data can be used for configuring the image processing modules in the display processor unit.

In this embodiment, the command cache 121 is configured to store the readable data acquired from the buffer 112. The command parser is configured to output the readable data to the image processing module in a preset format so as to configure the image processing module. Here, the preset format may be the size of the data. For example, the data is sized to 4 bytes, 32 bytes, or the like. The data size corresponding to the preset format is the same as the bandwidth of the interface of the image processing module.

The readable data can be temporarily stored by the command cache 121. On the one hand, multiple pieces of readable data can be stored to reduce the storage pressure on the buffer 112. On the other hand, the data size corresponding to the preset format is usually smaller than the size of a single piece of readable data, and the command parser cannot convert the readable data at one time, therefore the possibility of data loss can be reduced by temporarily storing the readable data by the command cache 121. Thus, the command cache 121 and the command parser permit the readable data to be transmitted with a bandwidth generally greater than the bandwidth of the interface of the display processor unit, rather than being transmitted in accordance with the bandwidth of the interface of the display processor unit, before being outputted to the display processor unit. In this way, the readable data can be transmitted with improved utilization of the transmission bandwidth.

In one embodiment, the command parser includes a first parser 122 or a second parser 123.

In the display processor unit, the configuration command includes a normal command and a coefficient command. The first parser 122 is configured to convert the normal command into a preset format. The second parser 123 is configured to convert the coefficient command. Here, the respective image processing modules configured based on the normal command usually correspond to the same interface bandwidth. Therefore, the output bandwidth of each first parser 122 is the same and is equal to the bandwidth of the modules of the display processor unit.

The coefficient command is used for configuring an image processing module including a 3D LUT in the display processor unit. Such modules of the display processor unit may have different interface bandwidths. For example, some modules of the display processor unit have a bandwidth of 36 bits, and some have a bandwidth of 48 bits. If each command parser has a uniform output bandwidth of 32 bits, the command parser needs to send a same configuration command twice. As a result, the bandwidth may not be fully utilized by the second sending.

The second parser 123 is configured to output the readable data to the image processing module in accordance with the magnitude of the output bandwidth of the second parser 123. The output bandwidth of the second parser 123 in each command interface 120 matches the bandwidth of each image processing module having a three-dimensional lookup table in the display processor unit, respectively.

In an embodiment of the present application, the command parsers in the command interfaces 120 corresponding to different image processing modules including 3D LUTs may be configured as second parsers 123, and the output bandwidth of the second parsers 123 is configured to match the bandwidth of the image processing modules. Therefore, for such image processing modules including 3D LUTs, it is unnecessary to transmit one configuration command multiple times, the bandwidth of the interface can be effectively utilized, and the image processing modules can be configured with improved efficiency.

With the use of the command configuration unit 100 described above, the bit width of the readable data can be converted into a bit width that can be accepted by the interfaces of the image processing modules, and the readable data and the read request being transmitted can be transmitted in accordance with the bandwidth of the transmission bus, which is greater than the bit width of the interfaces of the image processing modules. In this way, the utilization of the transmission bandwidth can be improved to improve the efficiency of configuration of the display processor unit. Meanwhile, requesting or parsing of a plurality of configuration commands can be performed in parallel by the command configuration unit 100 described above, whereby the efficiency of configuration of the display processor unit can be further improved.

Figure 5:
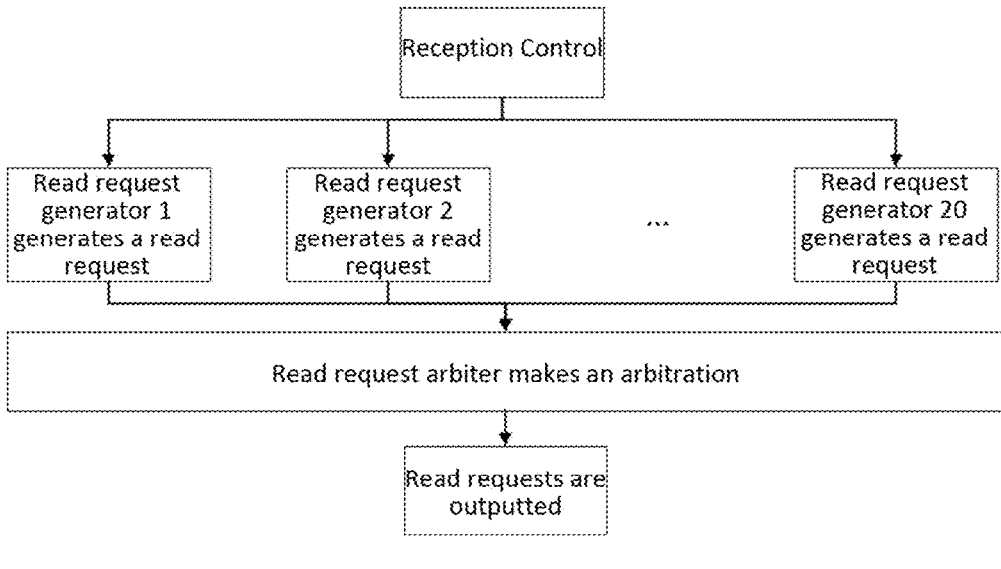
FIG. 5 is a schematic diagram of an operation of a read request channel according to an embodiment of the present application.
Figure 6:
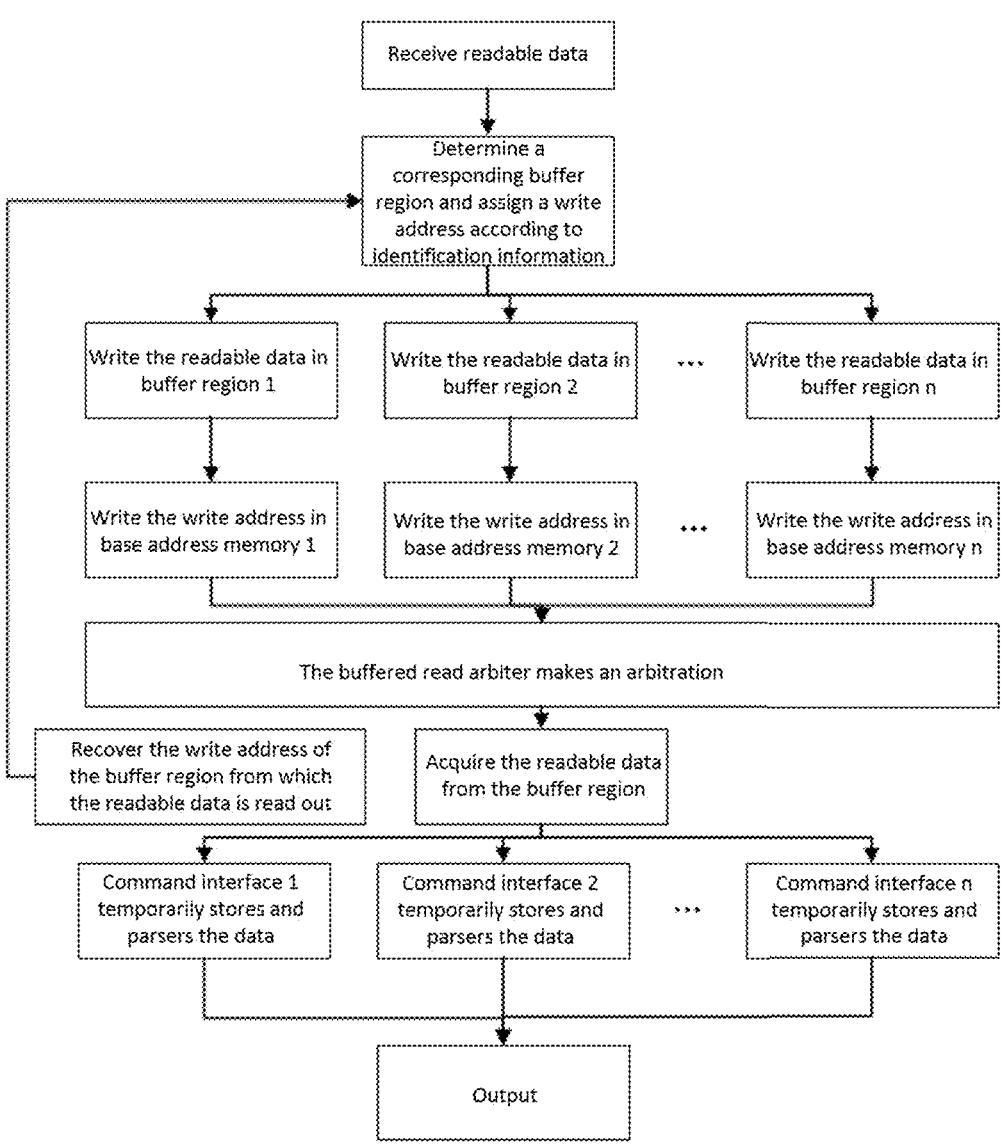
FIG. 6 is a schematic diagram of reception and parsing of readable data according to an embodiment of the present application.

For ease of understanding, an example is provided herein for illustration, which should not be regarded as limiting the present application. Referring to FIGS. 5 and 6, FIG. 5 is a schematic diagram of an operation of a read request channel according to an embodiment of the present application, and FIG. 6 is a schematic diagram of reception and parsing of readable data according to an embodiment of the present application.

In this example, twenty command interfaces 120 are configured, and correspondingly, there are twenty read request generators 131, and there are twenty buffer regions. A circuit corresponding to weighted polling arbitration is used as the read request arbiter 132. The buffer region can store 256 bytes of data. The command interfaces 120 and the interfaces of the image processing modules have a bandwidth of 4 bytes. A transmission bus between the memory and the command configuration unit 100 has a bandwidth of 32 bytes.

First, as shown in FIG. 5, each read request generator 131 is controlled by the controller of the display processor unit to generate a read request corresponding to each image processing module. The read request may include an identifier and/or an address corresponding to a storage region of readable data in the memory and is sent through the read request arbiter 132 to the memory.

Next, as shown in FIG. 6, the selector 111 determines a corresponding buffer region and assigns a write address for the readable data acquired from the memory according to the identification information, and then stores the readable data in the corresponding buffer region. As another example, each buffer region has a size of 256 bytes, and data is read or written in units of 64 bytes.

Then, the write address and the read address are provided to a base address memory. The base address memory determines a write address of the readable data that can be read out and provides the write address to the corresponding command interface 120. Here, data is read or written in units of 64 bytes, thus 64 bytes of readable data can be written each time.

The buffered read arbiter 115 controls each command interface 120 to acquire the readable data from the buffer region of the buffer 112 according to a preset reading priority rule. Furthermore, if there is readable data read out from the buffer region, the address cache 113 records the corresponding read address.

The readable data acquired by each command interface 120 is stored in the command cache 121, and the readable data waits for being converted in a preset format and outputted to an image processing module by the command parser so as to configure the image processing module. Here, the command cache 121 may read from the buffer 112 with a bandwidth of 64 bytes, and each command interface may output the converted readable data at 4 bytes. Here, the command interfaces having a second parser may parse the readable data including a coefficient command, and the command interfaces having a first parser may parse the readable data including a normal command.

Based on the same inventive concept, an embodiment of the present application further provides a command configuration method. The command configuration method is applicable to a command configuration unit 100 according to the foregoing embodiment.

Figure 7:
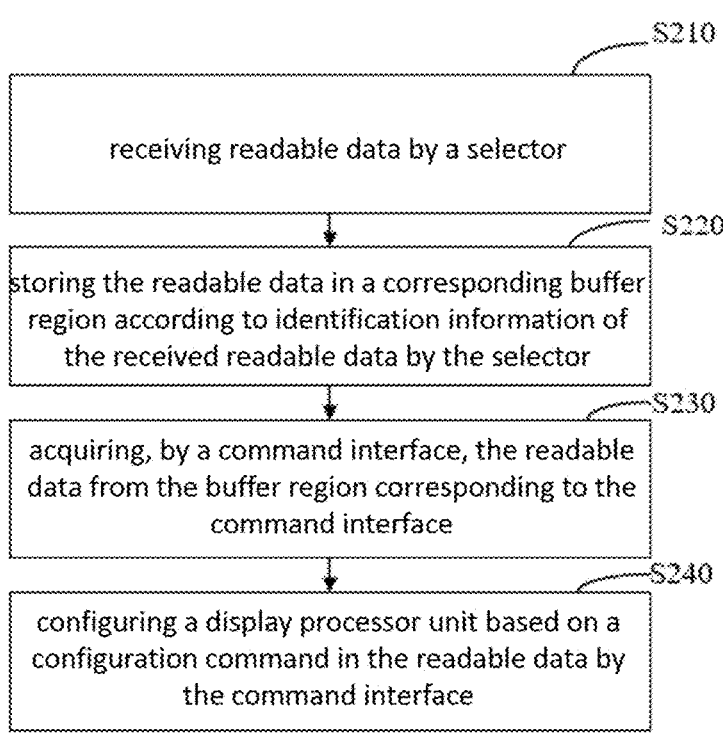
FIG. 7 is a flowchart of a command configuration method according to an embodiment of the present application.

Referring to FIG. 7, FIG. 7 is a flowchart of a command configuration method according to an embodiment of the present application. The command configuration method comprises:

S210 of receiving readable data by a selector;

S220 of storing the readable data in a corresponding buffer region according to identification information of the received readable data by the selector;

S230 of acquiring, by a command interface, the readable data from the buffer region corresponding to the command interface; and S240 of configuring a display processor unit based on a configuration command in the readable data by the command interface.

In one embodiment, before receiving readable data by the selector, a read request may also be sent to a memory by each read request generator 131. Thus, the memory sends the readable data to the buffer in response to the read request.

In one embodiment, after each read request generator 131 sends a read request to the memory, the order of output of each read request may further be controlled by a read request arbiter 132. Here, the read request arbiter 132 is configured to control the order of output of each read request based on a preset output priority rule.

In one embodiment, after the readable data is stored in the corresponding buffer region according to the identification information of the received readable data by the selector, a write address of the readable data in the buffer region and a read address of the readable data read out from the buffer region may further be stored by an address cache 113. Correspondingly, S230 includes acquiring the readable data from the buffer region corresponding to the command interface by the command interface and the write address.

In one embodiment, after the write address of the readable data in the buffer region and the read address of the readable data read out from the buffer region are stored by the address cache 113, the write address may further be provided by a base address memory to the command interface connected to the base address memory.

In one embodiment, the step of acquiring, by a command interface, the readable data from the buffer region corresponding to the command interface may further include: acquiring the readable data from the buffer through a reading priority rule preset in a buffered read arbiter 115.

In one embodiment, the step of configuring a display processor unit based on a configuration command in the readable data by the command interface includes: storing the readable data acquired from the buffer by a command cache 121; and outputting the readable data to an image processing module in a preset format by a command parser to configure the image processing module.

In one embodiment, the step of outputting the readable data to an image processing module in a preset format by a command parser includes: parsing the configuration command including a coefficient command by a second parser 123. The coefficient command is used for configuring an image processing module having a three-dimensional lookup table. The second parser 123 is configured to output the readable data to the image processing module in accordance with the magnitude of the output bandwidth of the second parser 123. The output bandwidth of the second parser 123 in each command interface matches the bandwidth of each image processing module having a three-dimensional lookup table in the display processor unit, respectively.

Figure 8:
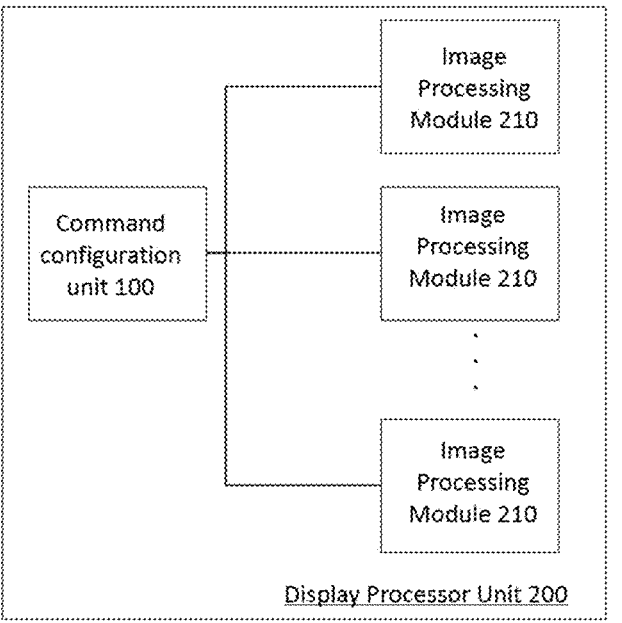
FIG. 8 is a schematic diagram of a display processor unit according to an embodiment of the present application.

Based on the same inventive concept, an embodiment of the present application further provides a display processor unit. Referring to FIG. 8, FIG. 8 is a schematic diagram of a display processor unit according to an embodiment of the present application. The display processor unit comprises: a command configuration unit 100 and a plurality of image processing modules 210.

The plurality of image processing modules 210 are connected to command interfaces of the command configuration unit 100, respectively. The command configuration unit may be implemented with reference to the command configuration unit 100 according to any of the foregoing embodiments, and the image processing modules 210 may be implemented with reference to image processing modules in a prior display processor unit and will not be described in detail herein.

Figure 9:
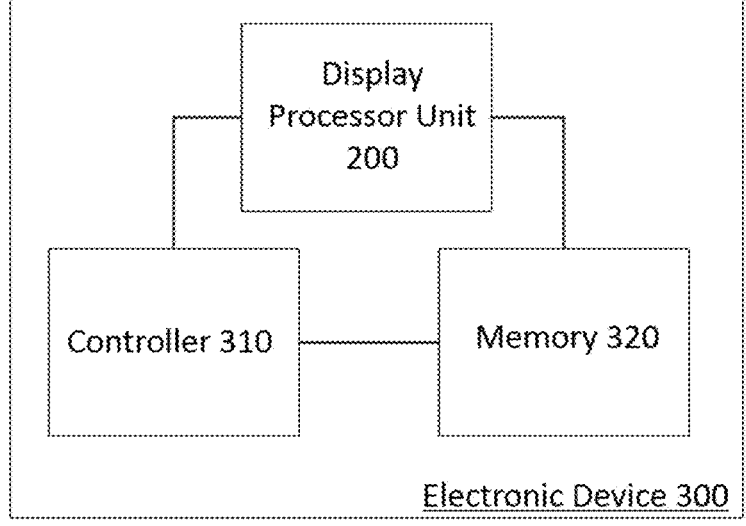
FIG. 9 is a schematic diagram of an electronic device according to an embodiment of the present application.

Based on the same inventive concept, an embodiment of the present application further provides an electronic device. Referring to FIG. 9, FIG. 9 is a schematic diagram of an electronic device 300 according to an embodiment of the present application. The electronic device 300 comprises: a display processor unit 200, a controller 310, and a memory 320.

The display processor unit 200 may be the display processor unit 200 according to the foregoing embodiment. The specific description thereof may be understood with reference to the foregoing description and will be omitted herein.

Prior devices may be used as the controller and the memory. For example, a CPU may be used as the controller 310, and a DRAM or the like may be used as the memory 320. The controller, the memory, and the display processor unit 200 are communicatively connected to one another via a bus.

In an embodiment of the present application, the controller 310 is configured to generate readable data and store the readable data in the memory, and the memory 320 is configured to output the readable data to the display processor unit 200 in response to a read request from the display processor unit. The functions of the controller 310 and the memory 320 in the electronic device may be understood with reference to the prior art and will not be described further herein.

In one embodiment, the memory 320 is configured with a plurality of storage regions. Each storage region corresponds to a different command interface, respectively. Each storage region is configured to store the readable data corresponding to each command interface, respectively.

The memory 320 is partitioned, whereby the readable data can be acquired from the corresponding storage region according to identification information corresponding to the command interface included in the read request to perform configuration of the display processor unit.

Figure 10:
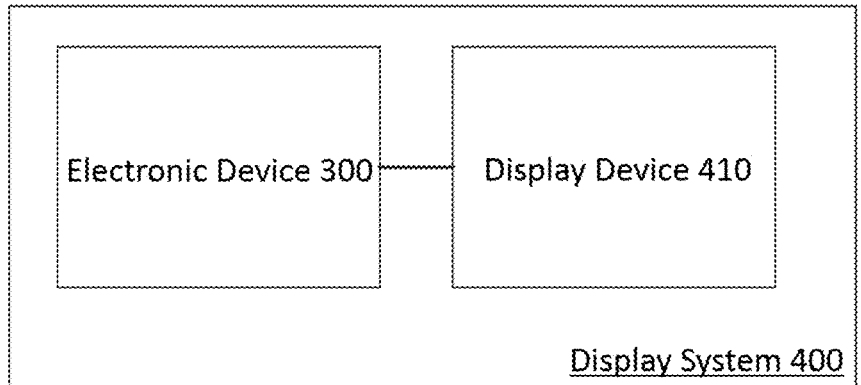
FIG. 10 is a schematic diagram of an image display system according to an embodiment of the present application.

Based on the same inventive concept, an embodiment of the present application further provides an image display system. Referring to FIG. 10, FIG. 10 is a schematic diagram of an image display system according to an embodiment of the present application. The image display system 400 comprises: an electronic device 300 and a display device 410. The electronic device 300 may be an electronic device according to any of the foregoing embodiments.

The display device 410 is communicatively connected to the electronic device 300 and configured to receive and display image data outputted from a display processor unit in the electronic device 300.

In some embodiments, the display device may be arranged in the electronic device, as a part of the structure of the electronic device.

The above description is only illustrative of specific embodiments of the present application, but the scope of protection of the present application is not limited thereto. Any variations or alternatives that can be easily envisaged by those skilled in the art within the scope of the technology disclosed in the present application are encompassed by the scope of protection of the present application. Therefore, the scope of protection of the present application shall be determined based on the scope of protection of the claims.

It should be noted that the terms "comprising", "including", or any other variation thereof, as used herein, are configured to cover a non-exclusive inclusion, so that a process, method, article, or device that comprises a list of elements includes not only those elements, but also includes other elements not expressly listed or elements inherent to such process, method, article, or device. Without further restrictions, an element defined by the phrase "comprising a . . . " does not exclude the existence of other identical elements in a process, method, article, or device comprising the element.

What is claimed is:

1. A command configuration unit, comprising:

a readable data channel, comprising a buffer and a selector, the buffer being connected to the selector, the buffer being configured with a plurality of buffer regions; the selector being connected to a memory that outputs readable data, the readable data comprising a configuration command and identification information, the configuration command comprising parameters for configuring each image processing module in a display processor unit, and the identification information representing a buffer region corresponding to the readable data; and a plurality of command interfaces, each of which is connected to the buffer, respectively, and each of which is configured to correspond to a different one of the buffer regions, respectively; and each of the command interfaces being connected to a respective image processing module, wherein the selector is configured to receive the readable data and store the readable data in a corresponding buffer region according to the identification information; and each of the command interfaces is configured to acquire the readable data from the corresponding buffer region and configure the respective image processing module based on the configuration command in the readable data, wherein the readable data channel further comprises: an address cache, connected to the buffer and to each of the command interfaces, respectively, wherein the address cache is configured to store a write address of the readable data in the buffer region and a read address of the readable data read out from the buffer region;

each of the command interfaces is configured to read the readable data from the buffer region according to the write address; and the selector is configured to store the readable data in the corresponding buffer region according to the read address and the identification information.

2. The command configuration unit according to claim 1, further comprising: a read request channel, the read request channel comprising a plurality of read request generators, and each of the read request generators corresponding to a different one of the command interfaces, respectively, wherein each of the read request generators is configured to send a read request to the memory; and the memory is configured to send the readable data to the buffer in response to the read request.

3. The command configuration unit according to claim 2, wherein the read request channel further comprises a read request arbiter; and the read request arbiter is connected to each of the read request generators and is configured to be connected to the memory; and the read request arbiter is configured to control an order of output of each of read requests based on a preset output priority rule.

4. The command configuration unit according to claim 1, wherein the readable data channel further comprises a base address memory group, the base address memory group comprises a plurality of base address memories, and the address cache is connected to each of the command interfaces through each of the base address memories, respectively; and each of the base address memories is configured to provide the write address for a command interface connected to the one of the base address memories after the readable data is stored in the buffer region.

5. The command configuration unit according to claim 1, wherein the readable data channel further comprises a buffered read arbiter; and the buffered read arbiter is connected to the buffer and to each of the command interfaces, respectively; and the buffered read arbiter is configured to instruct each of the command interfaces to acquire the readable data from the buffer.

6. The command configuration unit according to claim 1, wherein the buffer regions corresponding to the respective command interfaces share a storage space of the buffer, and a storage space corresponding to each of the buffer regions is allocated according to a quantity of the readable data in the buffer corresponding to each of the command interfaces.

7. The command configuration unit according to claim 1, wherein each of the command interfaces comprises a command cache and a command parser, the command cache is connected to the buffer, and the command cache is connected to the command parser; and the command parser is configured to be connected to the image processing module;

the command cache is configured to store the readable data acquired from the buffer; and the command parser is configured to output the readable data to the image processing module in a preset format to configure the image processing module.

8. The command configuration unit according to claim 7, wherein the command parser comprises a first parser or a second parser;

the configuration command comprises a coefficient command, which is configured for configuring an image processing module having a three-dimensional lookup table; and the second parser is configured to output the readable data to the image processing module in accordance with a magnitude of an output bandwidth of the second parser; and the output bandwidth of the second parser in each of the command interfaces matches a bandwidth of each of image processing modules having the three-dimensional lookup table in the display processor unit, respectively.

9. A display processor unit, comprising:

the command configuration unit according to claim 1; and a plurality of image processing modules, connected to the command configuration unit, respectively.

10. An electronic device, comprising:

the display processor unit according to claim 9; and a controller and a memory, the memory being connected to the controller and the display processor unit, respectively, wherein the controller is configured to generate the readable data and store the readable data into the memory; and the memory is configured to output the readable data to the display processor unit in response to a read request from the display processor unit.

11. The command configuration unit according to claim 2, wherein each of the command interfaces comprises a command cache and a command parser, the command cache is connected to the buffer, and the command cache is connected to the command parser; and the command parser is configured to be connected to the image processing module;

the command cache is configured to store the readable data acquired from the buffer; and the command parser is configured to output the readable data to the image processing module in a preset format to configure the image processing module.

12. The command configuration unit according to claim 3, wherein each of the command interfaces comprises a command cache and a command parser, the command cache is connected to the buffer, and the command cache is connected to the command parser; and the command parser is configured to be connected to the image processing module;

the command cache is configured to store the readable data acquired from the buffer; and the command parser is configured to output the readable data to the image processing module in a preset format to configure the image processing module.

13. The command configuration unit according to claim 1, wherein each of the command interfaces comprises a command cache and a command parser, the command cache is connected to the buffer, and the command cache is connected to the command parser; and the command parser is configured to be connected to the image processing module;

the command cache is configured to store the readable data acquired from the buffer; and the command parser is configured to output the readable data to the image processing module in a preset format to configure the image processing module.

14. The command configuration unit according to claim 4, wherein each of the command interfaces comprises a command cache and a command parser, the command cache is connected to the buffer, and the command cache is connected to the command parser; and the command parser is configured to be connected to the image processing module;

the command cache is configured to store the readable data acquired from the buffer; and the command parser is configured to output the readable data to the image processing module in a preset format to configure the image processing module.

15. The command configuration unit according to claim 5, wherein each of the command interfaces comprises a command cache and a command parser, the command cache is connected to the buffer, and the command cache is connected to the command parser; and the command parser is configured to be connected to the image processing module;

the command cache is configured to store the readable data acquired from the buffer; and the command parser is configured to output the readable data to the image processing module in a preset format to configure the image processing module.

16. The command configuration unit according to claim 6, wherein each of the command interfaces comprises a command cache and a command parser, the command cache is connected to the buffer, and the command cache is connected to the command parser; and the command parser is configured to be connected to the image processing module;

the command cache is configured to store the readable data acquired from the buffer; and the command parser is configured to output the readable data to the image processing module in a preset format to configure the image processing module.

* * * * *